United States Patent [19]
Swamy et al.

[11] Patent Number: 5,935,244
[45] Date of Patent: Aug. 10, 1999

[54] DETACHABLE I/O DEVICE FOR COMPUTER DATA SECURITY

[75] Inventors: N. Deepak Swamy, Austin; Robert L. McMahan, Cedar Park, both of Tex.

[73] Assignee: Dell USA, L.P., Round Rock, Tex.

[21] Appl. No.: 08/786,057

[22] Filed: Jan. 21, 1997

[51] Int. Cl.[6] .............................. G06F 12/14; G06F 3/00; G06F 13/00; G06F 15/00
[52] U.S. Cl. ........................ 713/200; 713/202; 708/135
[58] Field of Search .............................. 395/188.01, 186; 364/709.05

[56] References Cited

U.S. PATENT DOCUMENTS

| | | | |
|---|---|---|---|
| 5,212,729 | 5/1993 | Schafer | 380/4 |
| 5,341,167 | 8/1994 | Guichard et al. | 348/14 |
| 5,428,663 | 6/1995 | Grimes et al. | 455/31.2 |
| 5,475,839 | 12/1995 | Watson et al. | 395/650 |
| 5,552,776 | 9/1996 | Wade et al. | 340/825.31 |
| 5,559,961 | 9/1996 | Blonder | 395/188.01 |
| 5,574,786 | 11/1996 | Dayan et al. | 380/4 |
| 5,574,804 | 11/1996 | Olschafskie et al. | 250/338.1 |
| 5,691,928 | 11/1997 | Okaya et al. | 364/709.05 |
| 5,726,684 | 3/1998 | Blankenship et al. | 345/167 |
| 5,729,220 | 3/1998 | Russell | 341/22 |
| 5,758,174 | 5/1998 | Crump et al. | 395/750.05 |
| 5,771,441 | 7/1998 | Altstatt | 455/66 |

FOREIGN PATENT DOCUMENTS 8-161241  6/1996  Japan .............................. G06F 13/00

Primary Examiner—Robert W. Beausoliel, Jr.
Assistant Examiner—Brian H. Shaw
Attorney, Agent, or Firm—Skjerven, Morrill, MacPherson, Franklin & Friel, L.L.P.

[57] ABSTRACT

The present invention provides a personal computer system for receiving and retaining data and capable of securing data retained within the system against unauthorized access. More particularly, the system includes a computer including a processor and a detachable input/output (I/O) device that functions as a conventional computer interface when docked to the computer and wherein the computer system enters a suspend mode when the detachable I/O device is detached from the computer whereby the system data is secured against unauthorized access. A security module controls access to at least certain levels of data retained within the system by distinguishing between the detachable I/O device docked to the computer and the detachable I/O device detached from the computer. A docking station is coupled to the processor and is detachably coupled to the detachable I/O device. The detachable I/O device is, for example, a detachable trackpad or trackball I/O device and the docking station includes a sensor for detecting when the detachable I/O device is docked to the computer.

26 Claims, 3 Drawing Sheets

DETACHABLE I/O DEVICE FOR COMPUTER DATA SECURITY

BACKGROUND OF THE INVENTION

1. Field of the Invention

The present invention relates to computer systems and, more specifically, to such a system having security features enabling control over access to data retained in such a system.

2. Description of the Related Art

Personal computer systems in general and IBM compatible personal computer systems in particular have attained widespread use. These personal computing systems now provide computing power to many segments of today's modern society. A personal computer system can usually be defined as a desktop, floor-standing, or portable microcomputer that includes a system unit having a system processor with associated volatile and non-volatile memory, a display monitor, a keyboard, one or more floppy diskette drives, a hard disk storage device and an optional printer. One of the distinguishing characteristics of these systems is the use of a system board or mother board to electrically connect these components together. These personal computer systems are information handling systems which are designed primarily to give independent computing power to a single user and are inexpensively priced for purchase by individuals or small businesses. Some of these personal computer systems are portable and are often referred to as laptop, notebook or subnotebook computers.

With the phenomenal growth and use of personal computers in the world in recent years, more and more data or information is being collected and retained or stored in such systems. Much of this data is sensitive in nature. In the wrong hands, data could become embarrassing to individuals, a company could lose a competitive edge, or sensitive data could be used illegally causing physical, emotional and financial damage to others. As more users recognize the sensitive nature of data and its value, the more it becomes desirable to protect against such misuse. To protect themselves and the persons associated with the stored data, users, both individual and corporate, are requiring incorporation of security features into the personal computers that they purchase.

Other than using a basic password method, most presently existing security devices for computing systems provide security by controlling physical access to the computing device itself, such as a cable to lock the computer to a fixed object, or by physically controlling access to the power switch of a computing device rather than controlling access to the data retained within the system.

What is needed is a technique for controlling access to data retained within the computer system and preferably controlling access to various levels of authorization to meet the various security needs of individuals and corporations.

SUMMARY OF THE INVENTION

With the foregoing in mind, the present invention contemplates a new personal computer security feature which, when combined with other security features, places importance on rendering data stored in a computer system useless, i.e. inaccessible by an unauthorized user, rather than protecting the physical hardware from theft. The described security device and operating method advantageously supplies a cost-effective and portable method and apparatus for securing data in a computer system.

The present invention provides a personal computer system for receiving and retaining data and capable of securing data retained within the system against unauthorized access. More particularly, the system includes a computer including a processor and a detachable input/output (I/O) device that functions as a conventional computer interface when docked to the computer and wherein the computer system enters a suspend mode when the detachable I/O device is detached from the computer whereby the system data is secured against unauthorized access. A security module controls access to at least certain levels of data retained within the system by distinguishing between the detachable I/O device docked to the computer and the detachable I/O device detached from the computer. A docking station is coupled to the processor and is detachably coupled to the detachable I/O device. The detachable I/O device is, for example, a detachable trackpad or trackball I/O device and the docking station includes a sensor for detecting when the detachable I/O device is docked to the computer.

In accordance with an embodiment of the present invention, the detachable I/O device includes a non-volatile random access memory having an authorization signature code and the docking station includes a sensor for detecting the authorization signature code. The security module determines, from the authorization signature code, the allowed level of accessibility to system data and allows a user access to authorized levels of system data while securing unauthorized levels of system data.

In accordance with another embodiment of the present invention, the security module further controls access to at least certain levels of data retained within the system by determining, from an entered password, the allowed level of accessibility to system data and allows a user access to authorized levels of system data while securing unauthorized levels of system data.

In accordance with another embodiment of the present invention, the security module further controls access to at least certain levels of data retained within the system by requiring a pointer in a display of the computer system to be placed in a predetermined area on the display

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings. The use of the same reference symbols in different drawings indicates similar or identical items.

DESCRIPTION OF THE ILLUSTRATIVE EMBODIMENT(S)

Figure 1:
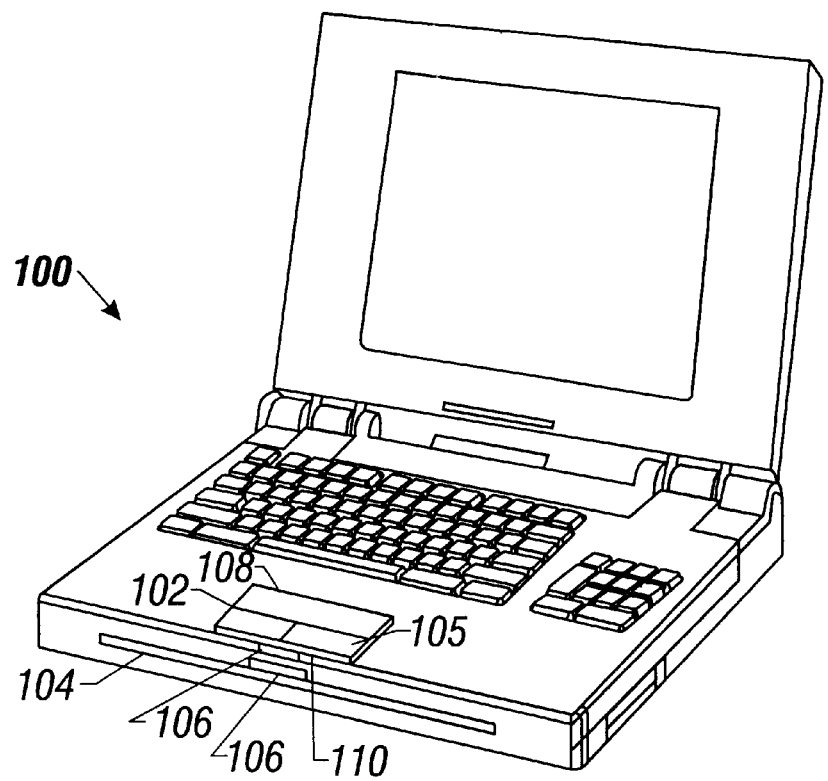
FIG. 1 is a pictorial frontal view, partially cutaway for clarification, showing a portable computer which includes a detachable input/output device for securing data when removed.

Referring to FIG. 1, a pictorial frontal view shows a portable computer 100 which includes a detachable input/ output (I/O) device 102 for entering data to the portable computer 100 when the detachable I/O device is coupled to the computer. In some embodiments, the removable input/output device 102 is integrated into a portable computer 100 such as a notebook or laptop computer as a standard feature. When the detachable I/O device 102 is detached from the computer 100 the system enters a secure or suspend to disk mode, securing against unauthorized access to data which has been received and retained within the computer system.

Figure 2:
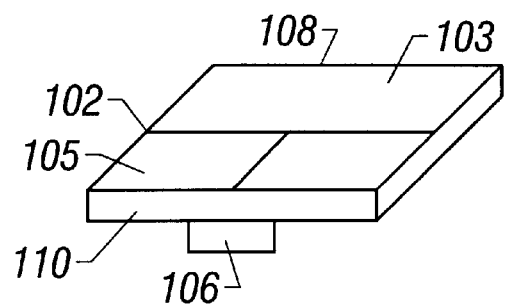
FIG. 2 is a plan view showing a modified track-pad or track-ball I/O device which interconnects to a main circuit board of a portable computer using a pair of board-to-board connectors.

In some embodiments, the detachable input/output device 102, illustrated in FIG. 2, is a modified version of standard track-pad or track-ball I/O devices. Illustrated in FIG. 2 is a modified version of a standard track-pad device, including capacitive area 103, buttons 105 and a connector 106, used as the detachable input/output device 102. Referring back to FIG. 1, the modified track-pad or track-ball I/O device 102 interconnects to a main circuit board 104 or motherboard of a portable computer 100 by detachably coupling to a docking station 105 which includes board-to-board connectors 106. Usage of board-to-board connectors 106, either surface mounted or through-hole versions, is advantageous in comparison to utilization of more conventional connectors such as a flex interconnect since board-to-board connectors 106 form a solid electromechanical connection while facilitating detachment, when desired. The docking station 105 forms a primary mechanical interlock area, such as, for example, a grooved section for aligning a leading edge 108 of the modified track-pad or track-ball I/O device 102 into. When a trailing edge 110 of the modified track-pad or track-ball I/O device 102 is seated, the board-to-board connectors 106 are simultaneously mated to furnish a solid electromechanical interconnect.

A "device present" pin (not shown) is included in the detachable input/output device 102 connector 106 to detect when the detachable input/output device 102 is connected to or detached from the computer 100. The docking station 105 includes a sensor (not shown) for detecting when the detachable I/O device 102 is docked to the computer. A security module (discussed in greater detail in the following figures) controls access to at least certain levels of data retained within the computer system 100 by distinguishing between the detachable I/O device 102 docked to the computer 100 and the detachable I/O device 102 detached from the computer 100. When the device present pin is indicative that the detachable I/O device 102 is connected, the security module allows the user, for example, complete access to data within the system. However, several variations of security and authorization levels may be incorporated into the system as described in the following figures.

Figure 3:
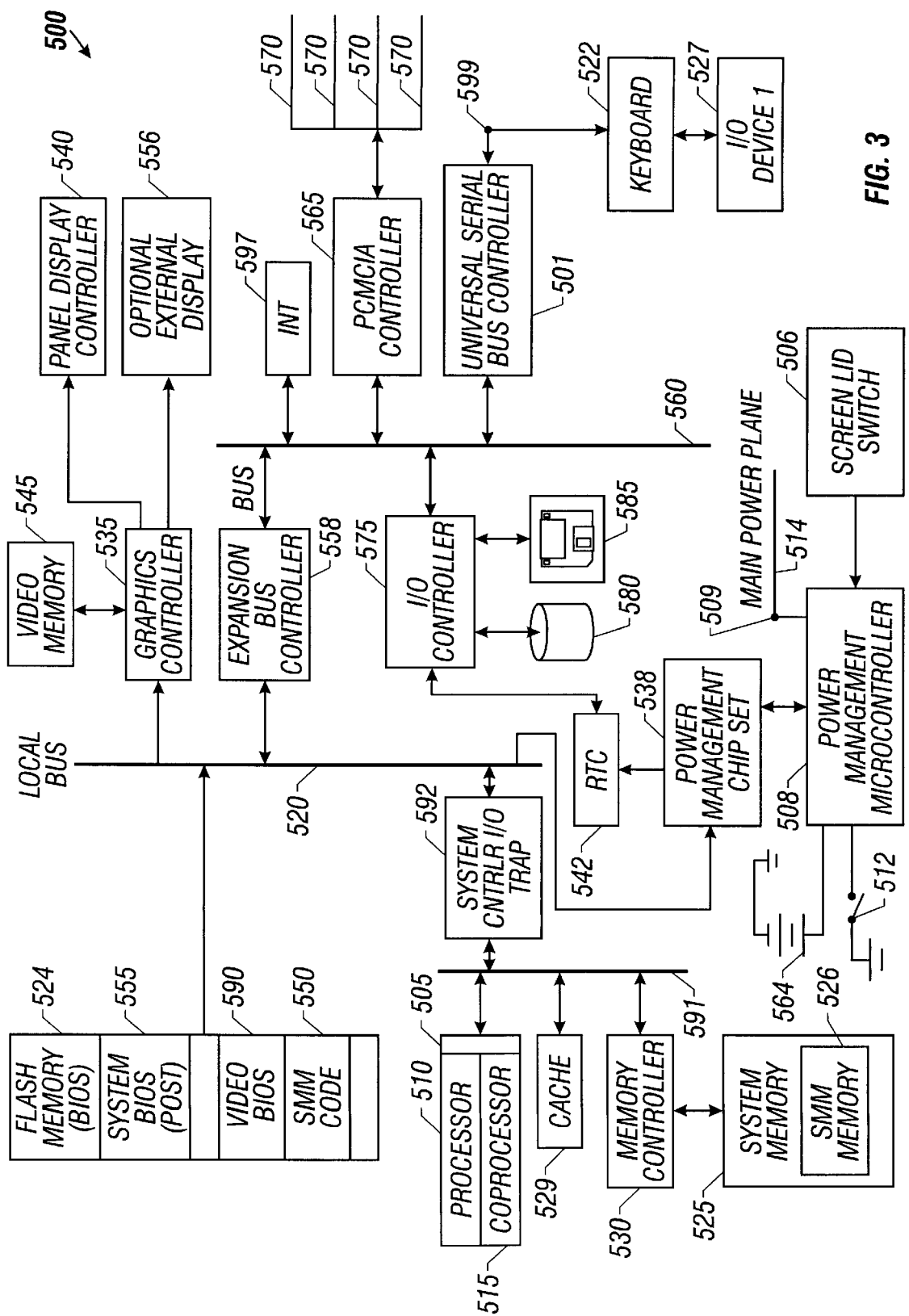
FIG. 3 is a block diagram showing a portable computer system which includes the detachable input/output device.

Referring to FIG. 3, a portable computer system 500 includes a microprocessor 505 which may also be called a CPU. In some embodiments, the microprocessor 505 is, for example, an Intel™ Pentium class microprocessor or Intel™ 80486 class microprocessor. The microprocessor 505 has a processor 510 for calculating integer operations and a coprocessor 515 for calculating floating point operations. Microprocessor 505 is connected to a cache 529 and a memory controller 530 via a CPU bus 591. The cache 529 may include both a primary cache (not shown) and a secondary cache (not shown).

A system controller I/O trap circuit 592 connects the CPU bus 591 to a local bus 520. The system controller I/O trap circuit 592 is generally characterized as part of a system controller such as a Pico Power Vesuvious or an Intel™ Mobile Triton chip set. In some embodiments, the system controller I/O trap circuit 592 is programmed to intercept a particular target address or address range. Upon intercepting a target address, the system controller I/O trap circuit 592 asserts an intercept signal indicating that the microprocessor 505 has attempted to access the target address.

In the some embodiments, the intercept signal is connected to an SMI ("system management interrupt") pin of the microprocessor 505, causing the microprocessor 505 to enter system management mode ("SMM").

A main memory 525, typically assembled from a plurality of dynamic random access memory ("DRAM") modules, is connected to the bus 591 by a memory controller 530. The main memory 525 stores application programs and data for execution by processor 510 and coprocessor 515 and includes a system management mode memory area.

A Basic Input Output System ("BIOS") memory 524 is connected to local bus 520. A FLASH memory or other nonvolatile memory is used as BIOS memory 524. BIOS memory 524 stores the system code which controls some operations of the portable computer system 500. BIOS 524 is a microcode software interface between an operating system or application programs and the hardware of computer system 100. The operating system and application programs access BIOS 524 rather than directly manipulating I/O ports and control words of the specific hardware. The security module may also be stored in non-volatile memory such as BIOS 524.

A graphics controller 535 is connected to the local bus 520 and to a panel display screen 540. The graphics controller 535 is also connected to a video memory 545 which stores information to be displayed on panel display 540. The panel display 540 is typically an active matrix or passive matrix liquid crystal display ("LCD") although other display technologies may be used as well. Graphics controller 535 is optionally connected to an optional external display or standalone monitor display 556. One example of a suitable graphics controller for usage as the graphics controller 535 is the Western Digital WD90C24A graphics controller.

A bus interface controller or expansion bus controller 558 connects the local bus 520 to an expansion bus 560. In the illustrative embodiment, expansion bus 560 is a Smart Management ("SM") bus which allows management of system resources for I/O devices, although other buses, for example, an Industry Standard Architecture ("ISA") bus may otherwise be used. A PCMCIA ("Personal Computer Memory Card International Association") controller 565 is connected to expansion bus 560. The PCMCIA controller 565 is connected to a plurality of expansion slots 570 to receive PCMCIA expansion cards such as modems, fax cards, communications cards, and other input/output devices. An interrupt request generator 597 is also connected to the expansion bus 560 and issues an interrupt service request over a predetermined interrupt request line after receiving a request signal from the processor 505 requesting issuance of an interrupt.

An I/O controller 575 is connected to expansion bus 560. The I/O controller 575 is interfaced to both an integrated drive electronics ("IDE") hard drive 580 and a floppy diskette drive 585.

A Universal Serial Bus ("USB") controller 501 transfers data to and from the processor 510 via the expansion bus 560. The detachable I/O device 527 and other auxiliary devices, such as a keyboard 522, are connected serially to a USB connector 599. This interconnection topology is implemented according the USB technology standard. These external devices including the detachable I/O device 527, the keyboard 522, and other auxiliary devices communicate with microprocessor 505 via the USB controller 501 and expansion bus 560. Auxiliary devices are typically communication devices such as a modem, a joystick, or another computer system.

The portable computer system 500 includes a power supply 564, such as a battery, which supplies operating power to the many devices of the portable computer system 500. The power supply 564 in the portable computer system 500 is a rechargeable battery, such as a nickel metal hydride ("NiMH") or lithium ion battery. The power supply 564 is connected to a power management microcontroller 508 which operates in the manner of an AC line adapter and controls the distribution of power from power supply 564. More specifically, the power control microcontroller 508 includes a power output terminal 509 connected to a main power plane 514 which supplies power to microprocessor 505. The power management microcontroller 508 is also connected to a power plane (not shown) supplying operating power to panel display 540. In the illustrative embodiment, the power control microcontroller 508 is a Motorola 6805 microcontroller. The power control microcontroller 508 monitors the charge level of the power supply 564 to determine when to charge a battery 564 and when to deny a charging voltage to the battery 564. The power control microcontroller 508 is connected to a main power switch 512 which the user actuates to turn on or shut off the portable computer system 500. While the power control microcontroller 508 powers down other portions of the portable computer system 500 such as hard drive 580 when not in use to conserve power, the power control microcontroller 508 itself is always connected to a source of energy, namely power supply 564.

The portable computer system 500 also includes a screen lid switch 506 or indicator for indicating when the panel display 540 is in the open or closed positions. The panel display 540 is generally located in the typical lid location for "clamshell" types of portable computers such as laptop or notebook computers. The panel display 540 forms an integral part of the lid of the computer and is set in either an open position with the screen accessible for usage or a closed condition for storage and porting.

The portable computer system 500 also includes a power management chip set 538 which includes power management chip models PT86C521 and PT86C22 manufactured by Pico Power. The power management chip set 538 is connected to microprocessor 505 via local bus 520 so that the power management chip set 538 receives power control commands from microprocessor 505. The power management chip set 538 is connected to a plurality of individual power planes supplying power to respective devices in the portable computer system 500 such as the hard drive 580 and floppy diskette drive 585, for example. The power management chip set 538 operates under control of the microprocessor 505 to control the power to the various power planes and devices of the computer. A real time clock ("RTC"),542 is connected to the I/O controller 575 and the power management chip set 538 so that time events or, alarms are transmitted to the power management chip set 538. The real time clock 542 is typically programmed to generate an alarm signal at a predetermined time.

When the portable computer system 500 is turned on or powered up, the system BIOS software stored in non-volatile BIOS memory 524 is copied into main memory 525 to execute instructions more quickly in a technique called "shadowing" or "shadow RAM". At this time, an SMM program code 550 is also copied into the system management mode memory area 526 of main memory 525. The microprocessor 505 executes SMM code 550 after the microprocessor 505 receives a system management interrupt ("SMI") which causes the microprocessor to enter system management mode (SMM) operation. In addition to the SMM code 550, a video BIOS 562 and a system BIOS program code 555 including a power-on self-test (POST) module are stored in the BIOS memory 524 and copied into main memory 525 at power-up. Alternative memory mapping schemes may also be used. For example, SMM code 550 may be stored in fast SRAM memory (not shown) connected to the local/CPU bus 520.

Figure 4:
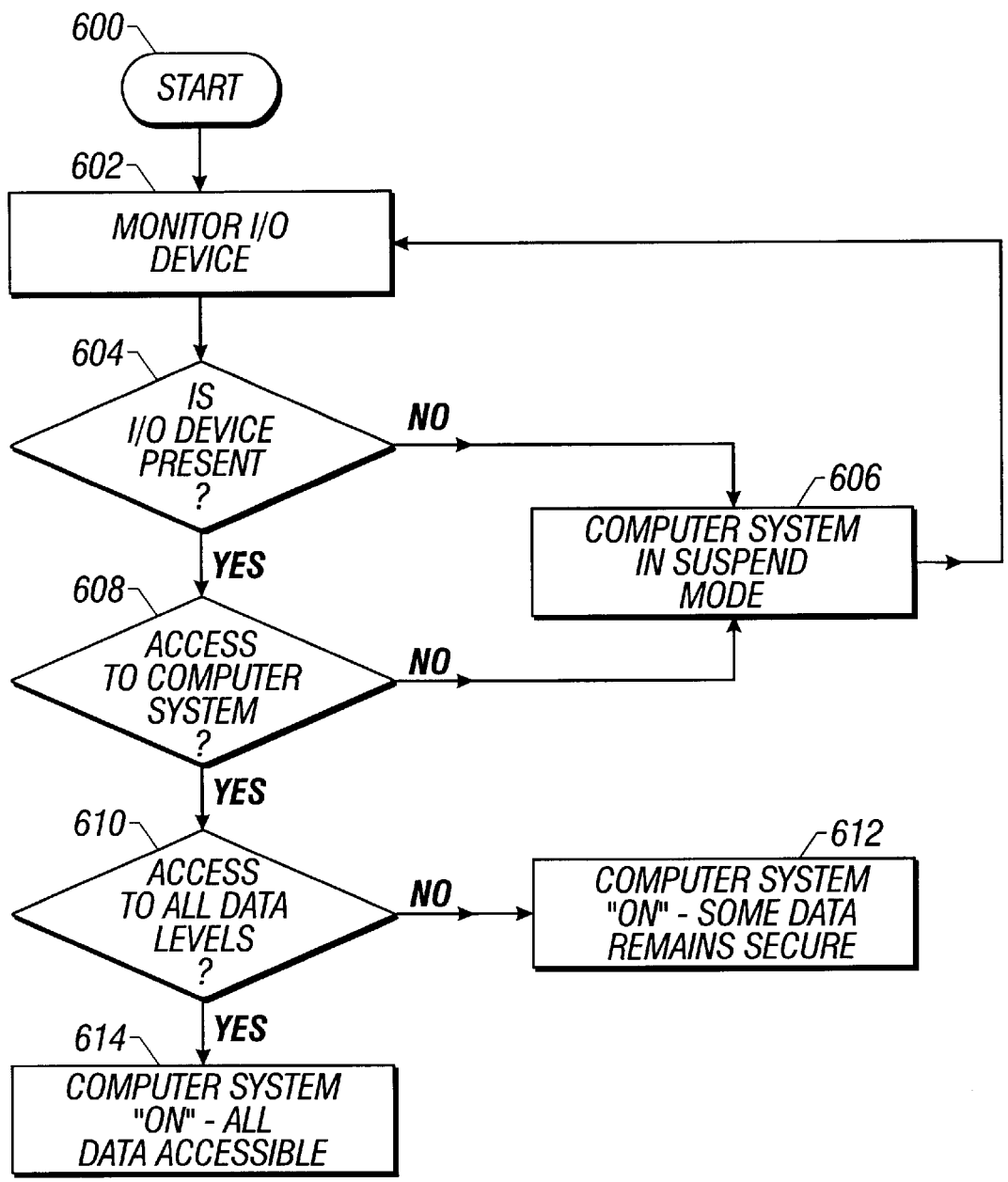
FIG. 4 shows a flowchart of a data securing sequence in accordance with the present invention.

FIG. 4 is a flow chart illustrating a method for securing data received and retained in a computer system from unauthorized access according to the present invention. After computer system 100 is initialized, process flow starts at block 600. As per block 602 the presence of the detachable I/O device 102 is monitored and the security module controls access to at least certain levels of data retained within the system by distinguishing, at decision block 604, between the detachable I/O device docked to the computer and the detachable I/O device detached from the computer 100. If the detachable I/O device 102 is not present or is detached from the computer 100, the system enters or remains in a suspend to disk mode according to block 606 and the system data is secured against unauthorized access. If the detachable I/O device 102 is present or is docked to the computer 100 the security module determines if the detachable I/O device 102 that is present allows the user access to the system itself. If the present I/O device 102 is not authorized, the computer system remains in a suspend to disk mode per block 606. If, however, the present I/O device 102 is an authorized device then the security module determines the authorization level or access level the user has to the system data per decision block 608.

For example, a number of users may be assigned to the same computer, however, each user's detachable I/O device (which is attachable to the same computer) will allow access to different areas or levels of data while keeping other levels of data secure. This would allow many users on one computer while each users data remains secure. The detachable I/O device 102 may, for example, include a non-volatile random access memory having an authorization signature code and the docking station 105 include a sensor for detecting the authorization signature code. The signature code may contain, for example, a company name, employee name, division or department, etc. The security module determines in block 610, from the authorization signature code, the allowed level of accessibility to system data and allows a user access to authorized levels of system data while securing unauthorized levels of system data per block 612, or the user may be authorized for all levels of data within the system per block 614. Other embodiments include various "layer" of security, for example, the security module further controls access to at least certain levels of data retained within the system by determining, from an entered password, the allowed level of accessibility to system data and allows a user access to authorized levels of system data while securing unauthorized levels of system data. In another embodiment, the security module further controls access to at least certain levels of data retained within the system by requiring a pointer in a display of the computer system to be placed in a predetermined area on the display.

While the invention has been described with reference to various embodiments, it will be understood that these embodiments are illustrative and that the scope of the invention is not limited to them. Many variations, modifications, additions and improvements of the embodiments described are possible. For example, although the disclosed system is based on a portable computer, other types of computers such as desktops, computer-aided design (CAD) systems, computer-aided manufacturing (CAM) systems, workstations, portable electronic diaries or address books and the like may also be used.

What is claimed is:

1. A computer system for receiving and retaining data and capable of securing data retained within the system against unauthorized access, the system comparing:

a computer including a processor;

a detachable input/output (I/O) device that functions as a conventional computer interface when docked to the computer and wherein the computer system enters a disabled mode when the detachable I/O device is detached from the computer thereby securing the system data against unauthorized access, the detachable I/O device further including a pin in a connector of the detachable I/O device that detects when the detachable I/O device is detached from the computer system and attache to the computer system, the enabling of the pin preventing the computer system from entering a disabled mode;

a security module for controlling access to a multiplicity of levels of data retained within the system by distinguishing between the detachable I/O device docked to the computer and the detachable I/O device detached from the computer; and a docking station coupled to the processor and detachably coupled to the detachable I/O device.

2. A computer system according to claim 1 wherein:
   the detachable I/O device is a detachable trackpad or trackball I/O device.

3. A computer system according to claim 1 wherein:
   the docking station includes:
      a sensor for detecting when the detachable I/O device is docked to the computer.

4. A computer system according to claim 1 wherein:
   the docking station includes:
      a board-to-board connector detachably coupling the detachable I/O device.

5. A computer system according to claim 1 wherein:
   the detachable I/O device includes:
      a non-volatile random access memory having an authorization signature code;
   the docking station includes:
      a sensor for detecting the authorization signature code; and
   the security module determines, from the authorization signature code, the allowed level of accessibility to system data and allows a user access to authorized levels of system data while securing unauthorized levels of system data.

6. A computer system according to claim 1 wherein:
   the security module further controls access to a multiplicity of levels of data retained within the system by determining, from an entered password, the allowed level of accessibility to system data and allows a user access to authorized levels of system data while securing unauthorized levels of system data.

7. A computer system according to claim 1 wherein:
   the security module further controls access to a multiplicity of levels of data retained within the system by requiring a pointer in a display of the computer system to be placed in a predetermined area on the display.

8. A security device for computer system data comprising:

a detachable input/output (I/O) device that functions as a conventional computer interface capable of controlling access to a multiplicity of levels of computer system data when docked to a computer system and wherein the computer system enters a disable mode when the detachable I/O device is detached from the computer thereby securing the system data against unauthorized access, the detachable I/O device further including a pin in a connector of the detachable I/O device the detects when the detachable I/O device is detached from the computer system and attached to the computer system, the enabling of the pin preventing the computer system from entering a disabled mode; and a docking station coupled to the computer and detachably coupled to the detachable I/O device.

9. A security device according to claim 8 wherein:
   the detachable I/O device is a detachable trackpad or trackball I/O device.

10. A security device according to claim 8 wherein:
    the docking station includes:
       a sensor for detecting when the detachable I/O device is docked to the computer.

11. A security device according to claim 8 wherein:
    the docking station includes:
       a board-to-board connector detachably coupling the detachable I/O device.

12. A security device according to claim 8 wherein:
    the detachable I/O device includes:
       a non-volatile random access memory having an authorization signature code; and
    the docking station includes:
       a sensor for detecting the authorization signature code.

13. A method for securing data received and retained in a computer system from unauthorized access, the method comprising the steps of:

sensing when a detachable input/output (I/O) device is docked to a docking station coupled to the computer and when said detachable I/O device is detached from the docking station, wherein the detachable I/O device functions as a conventional computer interface when docked to the docking station coupled to the computer and when the computer system enters a disabled mode when the detachable I/O device is detached from docking station thereby securing the system data against unauthorized access, the detachable I/O device is connector of the detachable I/O device further including a pin in a I/O device is detached from the computer system and attached to the computer system, the enabling of the pin preventing the computer system from entering a disabled mode; and controlling access to a multiplicity of levels of data retained within the system by distinguishing between the detachable I/O device docked to the computer and the detachable I/O device detached from the computer.

14. A method according to claim 13 wherein:
    the detachable I/O device is a detachable trackpad or trackball I/O device.

15. A method according to claim 13 wherein the sensing step is performed using a sensor included in the docking station.

16. A method according to claim 13 wherein:
    the docking station includes:
       a board-to-board connector detachably coupling the detachable I/O device.

17. A method according to claim 13 further comprising the steps of:
   providing a non-volatile random access memory having an authorization signature code in the detachable I/O device;
   detecting the authorization signature code; and
   determining, from the authorization signature code, the allowed level of accessibility to system data and allowing a user access to authorized levels of system data while securing unauthorized levels of system data.

18. A method according to claim 13 further comprising the steps of:
   determining, from an entered password, the allowed level of accessibility to system data and allowing a user access to authorized levels of system data while securing unauthorized levels of system data.

19. A method according to claim 13 further comprising the steps of:
   controlling access to a multiplicity of levels of data retained within the system by requiring a pointer in a display of the computer system to be placed in a predetermined area on the display.

20. An apparatus for securing data received and retained in a computer system from unauthorized access, the apparatus comprising:
   a non-volatile memory;
   a detachable input/output (I/O) device that functions as a conventional computer interface when docked to the computer and wherein the computer system enters a disabled mode when the detachable I/O device is detached from the computer thereby the system data against unauthorized access, the detachable I/O device further including a pin in a connector of the detachable I/O device that detects when the detachable I/O device is detached from the computer system and attached to the computer system, the enabling of the pin preventing the computer system from entering a disabled mode;
   a security means, stored in the non-volatile memory, for controlling access to a multiplicity of levels of data retained within the system by distinguishing between the detachable I/O device docked to the computer and the detachable I/O device detached from the computer; and
   a docking means coupled to the computer and detachably coupled to the detachable I/O device.

21. An apparatus according to claim 20 wherein:
   the detachable I/O device is a detachable trackpad or trackball I/O device.

22. An apparatus according to claim 20 wherein:
   the docking means includes:
      a sensor for detecting when the detachable I/O device is docked to the computer.

23. An apparatus according to claim 20 wherein:
   the docking means includes:
      a board-to-board connector detachably coupling the detachable I/O device.

24. An apparatus according to claim 20 wherein:
   the detachable I/O device includes:
      a non-volatile random access memory having an authorization signature code;
   the docking means includes:
      a sensor for detecting the authorization signature code; and
   the security means determines, from the authorization signature code, the allowed level of accessibility to system data and allows a user access to authorized levels of system data while securing unauthorized levels of system data.

25. An apparatus according to claim 20 wherein:
   the security means further controls access to a multiplicity of levels of data retained within the system by determining, from an entered password, the allowed level of accessibility to system data and allows a user access to authorized levels of system data while securing unauthorized levels of system data.

26. An apparatus according to claim 20 wherein:
   the security means further controls access to a multiplicity of levels of data retained within the system by requiring a pointer in a display of the computer system to be placed in a predetermined area on the display.

* * * * *